United States Patent [19]
McEwen

[11] Patent Number: 6,108,611
[45] Date of Patent: Aug. 22, 2000

[54] SIGNAL PROCESSING OF AN ARRAY OF SENSOR ELEMENTS IN A DETECTOR

[75] Inventor: Robert Kennedy McEwen, Essex, United Kingdom

[73] Assignee: GEC Marconi Limited, United Kingdom

[21] Appl. No.: 08/836,813

[22] PCT Filed: Nov. 24, 1995

[86] PCT No.: PCT/GB95/02755

§ 371 Date: Aug. 11, 1997

§ 102(e) Date: Aug. 11, 1997

[87] PCT Pub. No.: WO96/17471

PCT Pub. Date: Jun. 6, 1996

[30] Foreign Application Priority Data

Nov. 29, 1994 [GB] United Kingdom .................. 9424028

[51] Int. Cl.[7] ..................................... G01J 5/06
[52] U.S. Cl. ................. 702/90; 702/104; 702/191; 250/338.1; 382/275
[58] Field of Search ................. 702/90, 87, 104, 702/106, 189, 190, 191; 708/300; 364/724.011; 250/338.1; 356/51; 382/274, 275

[56] References Cited

U.S. PATENT DOCUMENTS

| | | |
|---|---|---|
| 4,628,352 | 12/1986 | Boue ........................................ 358/93 |
| 4,821,108 | 4/1989 | Barbagelata et al. ..................... 58/282 |
| 5,528,035 | 6/1996 | Masarik et al. ....................... 250/338.3 |
| 5,591,973 | 1/1997 | Masarik et al. .......................... 250/332 |
| 5,631,466 | 5/1997 | Botti et al. .............................. 250/332 |
| 5,682,035 | 10/1997 | Gallagher et al. ...................... 250/332 |
| 5,693,940 | 12/1997 | Botti et al. ........................... 250/252.1 |
| 5,729,016 | 3/1998 | Klapper et al. .......................... 250/334 |
| 5,763,882 | 6/1998 | Klapper et al. .......................... 250/332 |

FOREIGN PATENT DOCUMENTS

| | | |
|---|---|---|
| 0 138 579 | 4/1985 | European Pat. Off. . |
| 0 554 802 | 8/1993 | European Pat. Off. . |
| 2 569 510 | 9/1986 | France . |
| 2 148 658 | 5/1985 | United Kingdom . |
| 2 195 855 | 4/1988 | United Kingdom . |
| 90/09076 | 8/1990 | WIPO . |
| 93/23952 | 11/1993 | WIPO . |

*Primary Examiner*—Patrick Assouad
*Attorney, Agent, or Firm*—Venable; Robert J. Frank; Robert Kinberg

[57] ABSTRACT

A signal processor (10) receives both open and closed field values for elements of a detector (11) and corrects for non-uniformities in offset response between the elements prior to converting the signal via an A to D converter (15). The corrected signal is then digitally processed to compensate for linear and higher order non-uniformities in the response of the element. The invention enables the A to D converter to have relatively low resolution for a given output radiation.

16 Claims, 2 Drawing Sheets

SIGNAL PROCESSING OF AN ARRAY OF SENSOR ELEMENTS IN A DETECTOR

FIELD OF THE INVENTION

The present invention relates to apparatus for, and a method of, processing a signal received from an array of elements of a detector, and is particularly applicable to intra-red linear and two dimensional staring arrays and, especially, uncooled staring array sensors.

BACKGROUND OF THE INVENTION

Modem infrared sensors utilise a large number of detector elements to detect radiation and produce an electronic signal from which a thermal image or other information can be obtained. A major problem associated with such multi-element systems is that every element in the detector array has a unique response and offset associated with it, and these must be normalised to some common level for further processing or image display to be performed. Frequently, the response can vary by over 50%, and the offset by several thousand equivalent degrees centigrade, from element to element. In addition, some higher order, non-linear variations between elements are frequently present. The non-uniformity correction processing circuit must be able to cope with these large ranges of transfer without introducing additional noise or distortion into the signal.

Several approaches to correcting detector non-uniformity have been developed over the years. The most obvious approach, frequently used with cooled detector technology such as CMT and InSb materials, has been to digitise the detector output directly to a high resolution, typically 12 to 14 bits. The digital data corresponding to each element is then added to a corresponding offset coefficient and multiplied by a corresponding response coefficient to produce the normalised signal for each element in the array. This can then be further processed for overall offset and gain to produce the thermal image or other signal processing.

One technique developed for uncooled detectors utilises the fact that many such detectors respond only to changes in scene temperature, and therefore the radiation incident on the detector must be interrupted, "chopped", to induce a signal from the detector. Even those detectors which do not require modulation to produce a signal can benefit from employing interruption means, chopper, which provides regular stable referencing for the system. In such systems the signal from each detector can be derived by subtracting the output of each element when viewing the chopper, or reference, from the output produced when viewing the scene. This "image difference processing" (IDP) results in the direct cancellation of individual offset variations between elements, requiring only the correction of response variations from element to element to give a normalised result. Using this IDP process, the period of time when the detector views the chopper or reference is generally known as the "closed" field, while the period of time when the detector views the scene is known as the "open" field. Under normal circumstances, open and closed fields operate sequentially, however in some systems it may only be necessary to view the chopper or scene occasionally, permitting several open fields to occur between successive closed fields or vice versa. The unchopped system is merely the extreme case where many open fields exist and relatively few—perhaps only one during the life of the system—closed fields occur.

Unfortunately, most applications for uncooled detector systems involve man portable operation, where mass and power consumption are at a premium. In addition, uncooled detectors are generally lower cost than their cooled counterparts, and thus the cost of the support electronics represents a higher proportion of the system costs. For these reasons, the direct quantisation of the output from uncooled detectors is generally avoided, since analogue to digital converters with sufficient resolution and bandwidth to do this are both power hungry and expensive. High power consumption also results in increased system mass, due to the increased battery power required, and a consequential increase in operating costs.

Several novel processing architectures have been developed to overcome these problems using lower resolution analogue to digital converters either in tandem or in combination with analogue preprocessing. FIG. 1 shows one such architecture for uncooled detector systems. The output from the detector 1 is first corrected for response via a multiplying digital to analogue converter (MDAC) 2. This is achieved by exposing the detector, normally during manufacture, uniformly at two levels, one of which may be "dark" or chopper, and obtaining from this a multiplication factor for each element by which subsequent values received by the element must be multiplied by MDAC 2 to correct for non-uniformities in response. These multiplication factors are stored in random access memory (RAM) 9. The corrected output value for each element is conveyed to summing amplifier 3, where the outputs of one or more digital to analogue converters (DACs) 4, 5 are subtracted from it. The resultant signal is then digitised, to the level required for display by the analogue to digital converter (ADC) 6.

The contents of offset RAM 7 are updated while the detector 1 is looking at a reference surface, the closed field, and the feedback loop around the DAC 5 and ADC 6 provides stabilisation to drive the input to the ADC 6 to mid range, or zero, during this period. This is achieved by digitising the difference between the DAC 5 and MDAC 2, which contains the response corrected signal, and adding the resultant to the data in the offset RAM 7. Consequently, after the offset RAM 7 has been updated it contains a digital equivalent of the detector response during the closed field, with every location in the RAM 7 corresponding to a unique element in the detector 1. If the loop gain is adjusted to exactly unity, where the LSB of the ADC 6 corresponds to exactly the LSB of the offset DAC 5, then any changes in detector offset are exactly nulled on every update once the loop has converged. During the open field this offset data is again fed to the DAC 5 and hence to the summing amplifier where it is subtracted from the response corrected signal, to generate the IDP data directly. This can then be digitised using the ADC 6 for subsequent processing such as temporal re-sequencing for compatibility with conventional video standards.

A global offset can be added to the signal at the summing amplifier to adjust the thermal window being digitised, thus matching the digitiser range to the thermal scene being observed. In FIG. 1, this global offset is achieved using a DAC 4 to provide the adjustment either manually or under the control of some automatic algorithm integrated in the custom IC 8.

For a thermal imaging sensor typical resolutions for the MDAC 2 and offset DAC 5 are 12 and 16 bits respectively, whilst the ADC 6 can be restricted to the 8 bits normally used for video display systems.

The offset loop is self correcting and changes in offset due to temperature drift or 1/f noise are automatically corrected every time the offset RAM 7 updates during the closed field.

During power up, any random data in the offset RAM 7 rapidly converges to the correct values due to the operation of the feedback loop. The rate of convergence to, and subsequent tracking of, the correct offset values is only limited by the dynamic range of the ADC 6 which determines the maximum step between successive updates to the offset data.

This signal processing algorithm and architecture has been successfully applied in low cost thermal imaging sensors based on arrays of 100×100 elements.

This approach, although offering the benefits of low cost, volume and power consumption, also has limitations. In particular, the response correction stage (the MDAC) has a limited bandwidth despite consuming a significant proportion of the total power of the analogue circuitry. This is particularly problematic when operating with larger or faster detector arrays where higher bandwidths are required, and is generally overcome by operating multiple analogue processing chains under the supervision of a single digital custom integrated circuit.

In addition, the relative position of the MDAC, 2, and the offset correction DAC, 5, in the processing chain are fixed, since the offset feedback loop must have the same gain for each element in the array to function properly. If the MDAC was placed after the offset correction DAC 5 this loop gain would be different for each element and would introduce image artifacts such as smearing. A consequence of this fixed architecture is that the responsivity correction MDAC 2 compounds the offset range significantly, thus increasing the dynamic range of the offset DAC 5 required.

A further limitation of this approach is the precision of the analogue processing circuits required, which are beyond the capability of current analogue ASIC facilities. Consequently, the analogue processing must be manufactured from commercially available DACs and MDACs, limiting the degree of integration and miniaturisation possible. This restriction limits the minimum costs and volumes achievable, particularly for multiple analogue channel systems.

All of these limitations and restrictions clearly reduce the benefits offered by the processing architecture over the alternative direct digitisation in the first place.

Ideally, the response correction would be implemented in the digital domain, after the signal has been digitised, thus eliminating the MDAC from the circuit and permitting the response matching function to be integrated with the remaining digital processing in ASIC technology. However, the response variations from the detector would then be digitised directly which would significantly limit the scene temperature range for which the system would function. This is shown schematically in FIG. 2, where the input to the ADC is plotted against temperature. The offset correction loop maintains the input to the ADC at zero during the closed field as before, but without the MDAC in the circuit, the response variations remain uncorrected. Consequently, when viewing the infra-red scene, the input to the ADC can be dominated by response variations. Typical response variations of ±50% can be present in large arrays of detectors, and elements close to the extreme response ranges saturate the ADC even for small temperature differences from the chopper or reference. The operating range of a system with response variations of ±50% is shown in FIG. 2 by the dotted box.

If more extreme temperatures are viewed using a global offset control such as the DAC 4 in FIG. 1, the problem becomes more acute. The output of the DAC effectively shifts the input voltage range of the ADC permitting more extreme voltages, and thus temperatures, to be digitised. Under such circumstances, extreme response elements saturate the ADC and, as the temperature difference from the chopper or reference increases, the outputs of fewer and fewer elements can be digitised. This is shown in FIG. 2 where the offset adjustment results in an ADC input range where saturation of some elements always occurs. For temperatures less than $T_2$ the lowest response elements saturate negatively, while for temperatures greater than $T_1$ the high response elements saturate positively. For temperatures between $T_1$ and $T_2$ all elements, except those very close to the normalised response, saturate the ADC input.

Hence the responsivity matching must be performed prior to the analogue to digital conversion if saturation problems are to be avoided, and this limitation has prevented the response correction being implemented digitally, despite the potential benefits. EP 0138579 partially addresses the problem of a limited resolution of an A to D converter by adopting a system in which dark field values are subtracted from open field values prior to conversion by the A to D converter. However the resolution available to the open field can still not exceed the resolution of the A to D converter. The present invention aims to overcome this limitation and permit the benefits already mentioned, together with additional functions, to be realised.

SUMMARY OF THE INVENTION

EP-0 554 802 discloses a system wherein the output of the A-to-D converter is fed back to a summing amplifier at the input of the A-to-D converter such as to compensate for non-linearity in a detector element by subtracting the average value of adjacent elements from the output of that element. U.S. Pat. No. 4,628,352 discloses a system where non-uniformity in a closed field response between different detector elements is compensated for prior to A-to-D conversion of the signal and subsequent processing. GB 2 195 855 discloses a system wherein an ambient energy pattern is subtracted from the open field signal prior to the open field signal being converted to a digital signal. With all these systems, the A-to-D converter has to be set to a range sufficient to transmit signals of minimum and maximum intensity received.

According to a fast aspect of the present invention there is provided signal processing apparatus for receiving an analogue signal conveying output values of elements of a detector, the apparatus comprising:

(a) an analogue to digital converter for receiving a signal derived from the output values of the detector elements;

(b) digital processing means for: receiving a digital output signal from the converter; for each detector element summing successive values representative of a viewed scene derived from the output signal of the converter; generating an output signal conveying the sum values for each detector element; and correcting for linear and/or higher order non-uniformities in the response of each element;

(c) a memory for receiving and storing digital values representative of the sum values;

(d) a digital to analogue converter for converting the digital values contained in the memory to an analogue signal; and (e) analogue signal modifying means for subtracting the sum value associated with a particular detector element from the corresponding detector output value prior to the signal being transmitted to the analogue to digital converter.

By employing the present invention it is no longer necessary to employ the MDAC of FIG. 1, as correction of non-uniformities in linear and higher order responses can be achieved in the digital processor. Furthermore the invention enables closed and open field values to be "tracked" and subtracted from the input of the A to D coverter such that the resolution of the apparatus is not limited by the resolution of the A to D converter. This offers considerable savings on both the cost of high resolution A to D converters and also on power consumption of such converters. The summing circuit effectively now only determines for each element the change between successive open fields and successive closed fields, the difference between closed and open fields being determined by the digital processing means.

Preferably, the analogue to digital converter has a resolution less than the detector and the digital processing means tracks successive values corresponding to a particular element and controls the analogue processing means such as to tend to maintain the signal applied to the converter within the range of the converter such that the signal output by each element in the array can be determined by the digital processing means to a greater resolution than that of the converter. Advantageously the signal from the array is received for both open and closed fields and the digital processing means tracks successive values relating to the intensity of any one element for both open and closed fields. This enables the resolution for both the closed and open fields to be far greater than that of the analogue to digital converter.

With some detectors it is not always required to have a closed field between subsequent frame readouts, in which case the "closed" field values may be obtained only once on manufacture or may be re-set periodically, for example at commencement of operation of an imager. Alternatively, several closed fields can be obtained between each open field.

The invention is particularly advantageous when employed in an imager having a detector and means for interrupting radiation incident on the detector, each element of the detector being read in both a closed field when radiation is interrupted, and in open field when radiation is incident on the detector.

For some uncooled infrared detectors the IDP process-is more complicated than the simple subtraction of closed field from open field signals. For example a 3 point IDP process may be required where half the preceding and half the succeeding closed fields are subtracted from the open field. This algorithm is particularly simple to implement with the present invention since the term to be subtracted from the open field data can readily be calculated during the update of the subsequent closed field. The original architecture of FIG. 1 required the 2 point IDP signal, produced during the open field by the summing amplifier, to be stored in an additional block of RAM and converted to 3 point IDP data when the subsequent closed field occurred. This additional field storage RAM is not required with the present invention since the open and closed field data are stored separately.

In addition to the IDP and response matching functions, global offset and gain adjustments can also be implemented digitally, thus eliminating a further DAC from the analogue processing architecture of FIG. 1. All of the digital processes can readily be integrated into a single digital application specific integrated circuit (ASIC) device. This results in a considerable reduction in cost, power consumption and volume of the signal processing electronics, yielding a more economical and marketable system.

Performing the linear and/or higher order responsivity correction digitally, rather than in the analogue domain permits the use of higher resolution responsivity coefficients. As already mentioned, a typical resolution for the MDAC of FIG. 1 is around 12 bits, limited by available device performance in a sufficient bandwidth. Digital responsivity correction can be implemented to a precision of 16 or more bits, limited only by the storage capacity made available. This increased response correction dynamic range offers several benefits. Firstly the precision of the response correction coefficients can be increased if required, permitting potentially increased uniformity in the final image, even for scenes at significantly different temperatures to the reference. Alternatively, a wider range of response variations can be tolerated, permitting lower uniformity detectors to be used in the system. Consequently the useful detector yield is increased, resulting in reduced system costs.

A minor limitation of the present invention is that the difference between sequential open fields or closed fields cannot be greater than the dynamic range of the ADC, to avoid saturation from occurring, i.e., the transient signal handling capability may be limited. Such saturation, if it did occur, would be transitory since subsequent frames from the detector enable the open or closed field data to converge to the correct levels, the number of frames required to achieve this being determined by the ratio of the transient change in signal to the dynamic range of the ADC used. Considering the practical implementation of the architecture to design an infra-red sensor with a sensitivity of $0.1°$ C., limited by the quantisation noise of, say, an 8 bit ADC, the maximum change in scene temperature of any element between frames would be $25.6°$ C. to prevent saturation from occurring. Thus, if the imager was panned across a scene containing an area $75°$ above the surroundings, the image of that part of the scene would require approximately three frames to converge to the final value, and a further three frames to return to background level once the hot area of the scene had been panned past. The resultant smear would be similar to, but not the same as, the smear caused by bright lights across a visible band video camera. In that instance, the smear decays gradually, however in this case, the smear would terminate sharply once the feedback signal to the summing amplifier brought the input signal to the ADC within the range of the ADC.

This smearing may not be a particular problem for many applications, but could be objectionable under some circumstances. One simple solution, reducing, but not eliminating the problem, would be to increase the resolution and dynamic range of the ADC. In the above example, a 10 bit ADC would provide for temperature transients of $102.4°$ C. between subsequent frames—suitable for most thermal imaging applications without saturation defects occurring Alternatively or in addition to the increased resolution ADC, the update of the open and/or closed field digital data can be restricted when the difference between the two exceeds the data range being displayed. Thus the open and closed feedback loops would not attempt to track signals which caused saturation of both the ADC and the display, and would therefore recover more rapidly from saturation when it occurred. The detection of such saturating conditions is relatively simple using the digital data for open and closed fields, the ADC output and the global gain and offset adjustment data.

Due to the occasional occurrence of such saturation, together with the limited visual effect and ease of correction, the restricted transient performance would not in most applications be a significant disadvantage.

According to a second aspect of the present invention there is provided a method of processing an analogue signal conveying the output values of an array of sensor elements in a detector, the method modifying the analogue signal to correct for any non-uniformity in the offset response of the elements, converting the modified signal to a digital signal, and further processing the signal to correct for linear and/or higher order non-uniformities in the response of the elements, the method comprising the steps of converting the analogue signal to a digital signal via a converter having a relatively low resolution, tracking the values output from the converter relating to the output values of particular elements of the detector, and modifying the analogue signal such as to tend to maintain the signal applied to the converter within the range of the converter thereby determining to a higher resolution that that of the converter the signal output by each element in the array.

BRIEF DESCRIPTION OF THE DRAWINGS

The invention will now be described in detail, in conjunction with the drawings in which.

DESCRIPTION OF THE INVENTION

Figure 1:
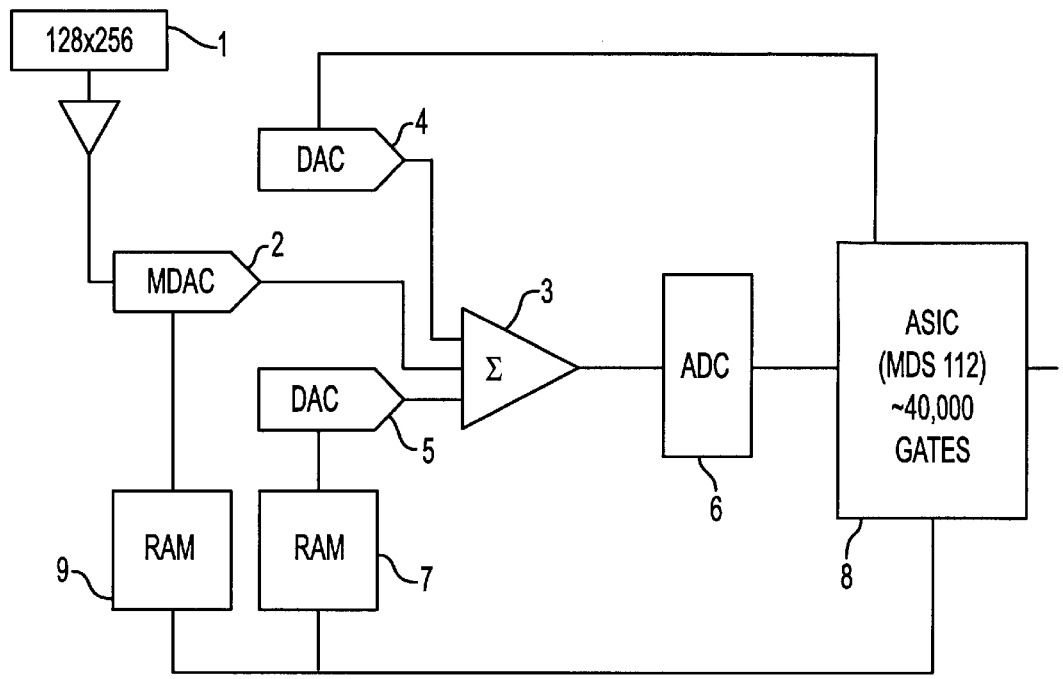
FIG. 1 is a block diagram of a convention processing system.
Figure 2:
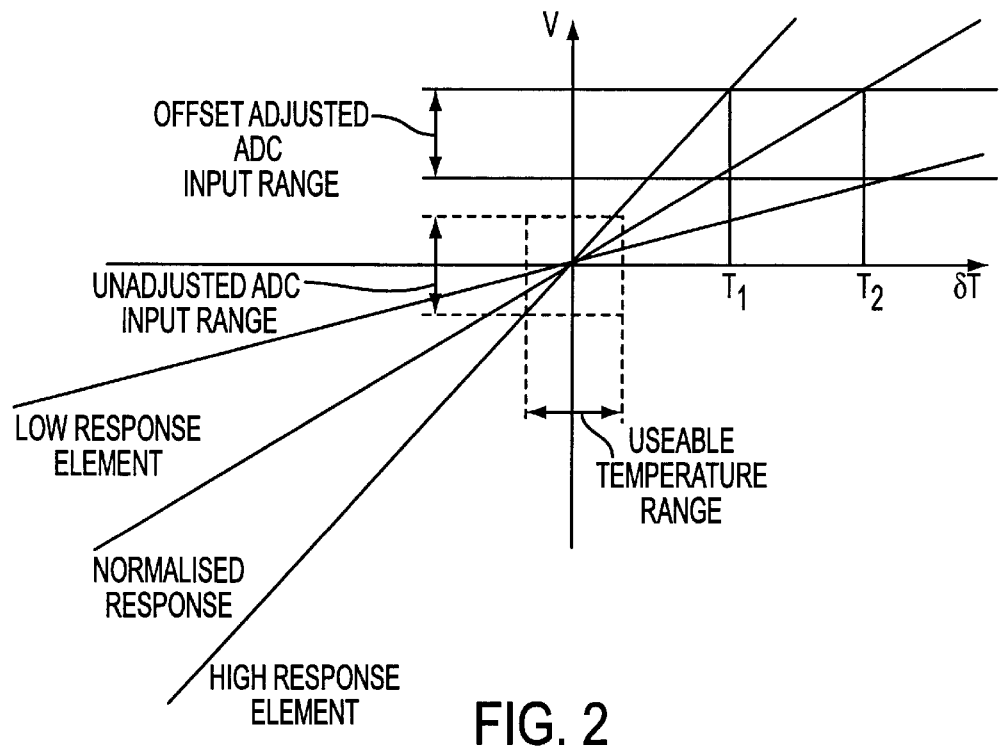
FIG. 2 is a plot of input to the ADC of the convention processing system versus temperature.
Figure 3:
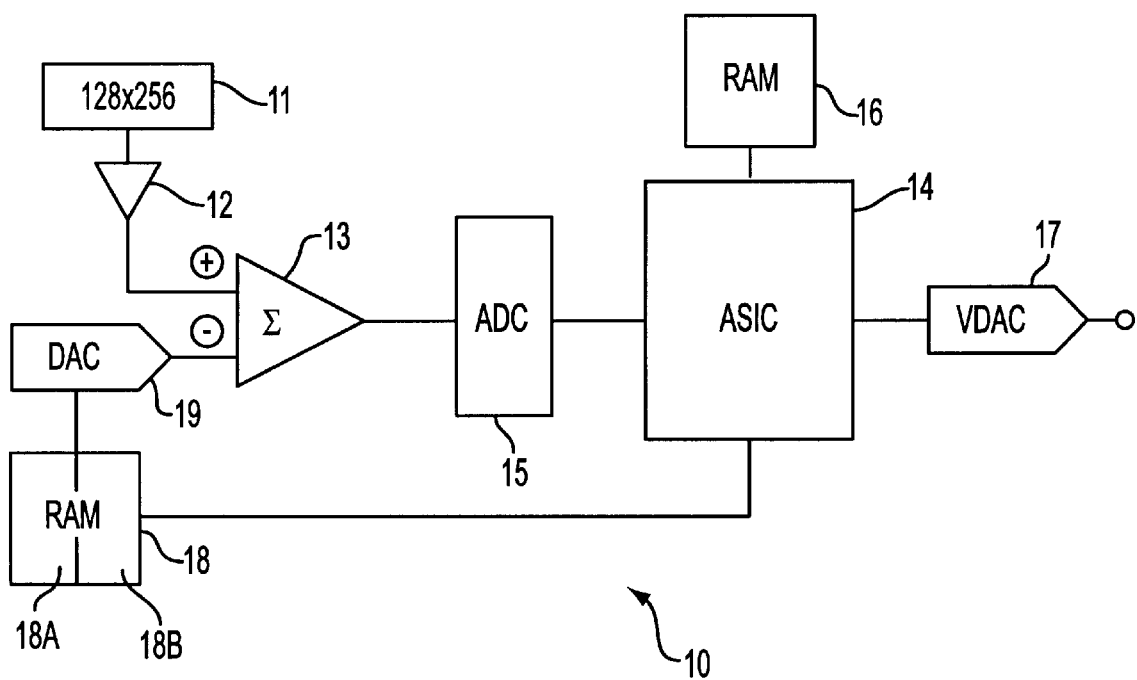
FIG. 3 is a block diagram of an embodiment of a signal processing system according to the invention.

One embodiment of the present invention will now be described by way of example only with reference to FIG. 3 of the accompanying drawings, a schematic diagram of an imager incorporating a signal processor in accordance with the present invention.

The imager 10 comprises a 128×256 array of sensor elements in a detector 11, and an amplifier 12 for amplifying the signal from the detector 11, the output of the amplifier 12 being fed to the input of summing amplifier 13. The output of the summing amplifier 13 is fed to an input of an application specific integrated circuit (ASIC) 14 via 8-bit analogue to digital converter (ADC) 15.

The ASIC has associated with it a random access memory (RAM) 16 the function of which is discussed below.

Also associated with the ASIC 14 is a video digital to analogue converter (VDAC) 17 which converts the time resequenced data, after correction for linear and higher order non-uniformities, into a conventional video format analogue signal.

The ASIC 14 is also connected to a RAM 18, the ASIC setting the values in the storage array of the RAM 18, each cell of which corresponds to an element of the detector. The RAM has two sections, 18A, 18B, and stores open field and closed field values in the two respective portions. These values are fed to the summing amplifier 13 via digital to analogue converter (DAC) 19, the summing amplifier for each element providing an output signal to the ADC 15 equal to the difference between the value received from the amplifier 12 and that stored in RAM 18 for both open and closed fields.

In operation the output of each element of the detector for a closed field is read out. The value in the corresponding cell of the closed field RAM 18A is subtracted from the output signal of the detector and the resultant value digitised by converter 15. The ASIC receives the digitised value for each element of the detector and sets each cell of the RAM such that if the next closed field value for each element remained the same, the output of the ADC would be at a mid-point of its range. If the initial value input to the ADC is outside the range of the ADC then the value stored in the RAM 18 rapidly converges to the value of the signal from the detector with each closed field readout until the output of the summing amplifier comes within the range of the ADC. The signal applied to the RAM will then track the output of the detector.

The imager 10 functions in exactly the same way in respect of open fields, storing the offset to be applied to the summing amplifier in the open field portion 18B of the RAM. The ASIC, knowing both the closed field and open field values applied to the RAM and the open and closed field received from ADC, computes a value relating to the intensity of radiation received by an element of the detector by taking the difference between the open and closed field values. Because the intensity of radiation incident on any one element of the detector is derived from the difference between closed and open field values any non-uniformity in offset response between the elements is immaterial.

However, linear and/or higher order non-uniformity in response is not compensated for in this manner. This has to be corrected by uniformly exposing all the elements to two different intensities of radiation. For each element the ASIC determines from the resultant two values received a constant by which the value of each element must be multiplied to correct for linear variations in response. This is stored in RAM 16 and applied to subsequent values received by the ASIC. Higher order non-uniformities can be corrected in a similar manner.

What is claimed is:

1. Signal processing apparatus for receiving an analogue signal conveying output values of elements of a detector, said detector comprising an array of elements, the apparatus comprising:

(a) an analogue to digital converter for receiving a signal derived from the output values of the detector elements;

(b) digital processing means for: (1) receiving a digital output signal from the analogue to digital converter; (2) for each detector element, summing successive values representative of a viewed scene and derived from the output signal of the analogue to digital converter; (3) generating an output signal conveying the sum values for each detector element; and (4) correcting for linear and/or higher order non-uniformities in the response of each detector element;

(c) a memory for receiving and storing digital values representative of the sum values;

(d) a digital to analogue converter for converting the digital values contained in the memory to an analogue signal; and (e) analogue signal modifying means for subtracting the analogue signal output by the digital to analogue converter from the analogue signal conveying output values of the elements of the detector, such that the sum value associated with a particular detector element is subtracted from the corresponding detector output value prior to the signal being transmitted to the analogue to digital converter.

2. Apparatus as claimed in claim 1, wherein the analogue to digital converter has a resolution less than the detector and wherein the digital processor means tracks successive values corresponding to a particular detector element and controls the analogue signal modifying means such as to tend to maintain the signal applied to the analogue to digital converter within the range of the converter such that the signal output by each detector element in the array can be determined by the digital processing means to a greater resolution than that of the analogue to digital converter.

3. Apparatus as claimed in claim 1, wherein the signal from the detector is received for both open and closed fields and wherein the digital processing means tracks successive values relating to the intensity of any one detector element for both open and closed fields.

4. Apparatus as claimed in claim 1, wherein for each element of the detector, both a closed field value and an open field value are stored, and wherein the analogue signal modifying means transmits to the analogue to digital converter the difference between the stored values and those received for the next subsequent closed and open fields.

5. Apparatus as claimed in claim 4, wherein the analogue signal modifying means comprises a summing amplifier for combining the values received from the detector with the stored values received via the digital to analogue converter.

6. Apparatus as claimed in claim 1, wherein the digital processing means comprises an application specific integrated circuit.

7. Apparatus as claimed in claim 1, wherein the digital processing means generates a signal corresponding to an image received by the detector by determining the difference in values for each detector element between open and closed fields.

8. An imager comprising apparatus as claimed in claim 1.

9. An imager as claimed in claim 8, further comprising:

a detector, comprising an array of elements; and means for interrupting radiation incident on the detector, each element of the detector being read in both a closed field, when radiation is interrupted, and in an open field, when radiation is incident on the detector.

10. A method of processing an analogue signal conveying the output values of an array of sensor elements in a detector, the method comprising the steps of:

modifying the analogue signal to correct for any non-uniformity in an offset response of the elements;

converting the modified signal to a digital signal using a converter having a relatively low resolution; and further processing the signal to correct for linear and/or higher-order non-uniformities in the response of the elements;

wherein the step of modifying the analogue signal further comprises the steps of:

tracking the values output from the converter corresponding to the output values of particular elements of the detector; and modifying the analogue signal so as to tend to maintain the signal applied to the converter within the range of the converter and thereby determining the signal output by each element in the array to a higher resolution than that of the converter.

11. A method as claimed in claim 10, further comprising the step of receiving signals from the array for both open and closed fields, and wherein the step of tracking further comprises the step of digitally tracking successive values corresponding to the output of any one element for both open and closed fields.

12. A method as claimed in claim 10, further comprising the steps of:

storing for each element of the array both a closed field value and an open field value in a random access memory; and determining the difference between the stored values and those received for the next subsequent closed field and open field of each element, respectively, before further processing the signal to correct for linear and/or higher-order non-uniformities in the response of the elements.

13. A method as claimed in claim 10, further comprising the steps of:

determining for each element the difference between closed and open field values; and generating an output signal in dependence thereon.

14. A method as claimed in claim 10, wherein the step of tracking the values output from the converter comprises the step of, for each element of the array, summing successive values representative of a viewed scene and derived from the converting step.

15. A method as claimed in claim 14, wherein the step of tracking the values output from the converter further comprises the step of storing the summed values in a memory.

16. A method as claimed in claim 15, wherein the step of modifying the analogue signal so as to tend to maintain the signal applied to the converter within the range of the converter comprises the steps of:

converting values stored in the memory to analogue signals; and subtracting said analogue signals from the analogue signal received from the detector.

* * * * *